US010936837B1

(12) United States Patent
Deacon et al.

(10) Patent No.: US 10,936,837 B1
(45) Date of Patent: Mar. 2, 2021

(54) 2D BARCODE OVERLAYS

(71) Applicant: Amazon Technologies, Inc., Seattle, WA (US)

(72) Inventors: Keith Francis Deacon, Monroe, WA (US); Jon Stuart Battles, North Bend, WA (US); Tak Keung Joseph Lui, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 15/987,688

(22) Filed: May 23, 2018

(51) Int. Cl.
G06K 7/14 (2006.01)
G06K 19/06 (2006.01)
G06K 7/10 (2006.01)
G06K 1/12 (2006.01)

(52) U.S. Cl.
CPC .......... *G06K 7/1417* (2013.01); *G06K 1/121* (2013.01); *G06K 7/10722* (2013.01); *G06K 19/06037* (2013.01); *G06K 19/06056* (2013.01)

(58) Field of Classification Search
CPC .. G06K 7/1417; G06K 7/10722; G06K 1/121; G06K 19/0637; G06K 19/06056
See application file for complete search history.

(56) References Cited

U.S. PATENT DOCUMENTS

| | | | | |
|---|---|---|---|---|
| 5,337,361 A * | 8/1994 | Wang | ...................... | G06K 19/18 235/462.11 |
| 5,576,528 A * | 11/1996 | Chew | ............... | G06K 19/06037 235/469 |
| 5,900,954 A * | 5/1999 | Katz | ...................... | G03H 1/041 283/86 |
| 5,988,897 A * | 11/1999 | Pierce | .............. | G07B 17/00193 400/103 |
| 6,070,805 A * | 6/2000 | Kaufman | ................. | G06K 7/14 235/462.04 |
| 6,180,318 B1 * | 1/2001 | Fitzer | ..................... | B41M 5/262 430/292 |
| 6,398,117 B1 * | 6/2002 | Oakeson | ................ | G06K 1/121 235/456 |
| 6,533,175 B1 * | 3/2003 | Herzig | ..................... | G06K 5/00 235/462.01 |
| 6,572,025 B1 * | 6/2003 | Nishikado | .............. | G06K 1/123 235/462.09 |
| 8,267,321 B2 * | 9/2012 | Kuyper-Hammond | ...................... | G06K 19/06028 235/462.09 |
| 8,485,428 B1 * | 7/2013 | Barker | ................ | H04L 63/1433 235/375 |
| 10,460,161 B1 * | 10/2019 | Lauer | ................. | G06K 9/00442 |

(Continued)

FOREIGN PATENT DOCUMENTS

JP 2013041496 A * 2/2013

*Primary Examiner* — Daniel I Walsh
(74) *Attorney, Agent, or Firm* — Patterson + Sheridan, LLP

(57) ABSTRACT

Embodiments herein describe a 2D barcode that overlays text or graphics (e.g., another barcode) while permitting the underlying text or barcode to be read by a user or a barcode scanner. Further, the embodiments herein describe techniques for separating the overlaid 2D barcode from the underlying text or graphics so that the barcode can be identified and decoded. In one embodiment, the blocks forming the 2D barcode are printed (or displayed) using a shade of a color while the text or graphics are printed (or displayed) using a darker shade of that same color.

10 Claims, 12 Drawing Sheets

(56) References Cited

U.S. PATENT DOCUMENTS

| | | | |
|---|---|---|---|
| 2001/0050308 A1* | 12/2001 | Paul | G06K 19/06028 235/375 |
| 2002/0030112 A1* | 3/2002 | Schreiber | G06K 7/12 235/494 |
| 2002/0179717 A1* | 12/2002 | Cummings | G06K 7/14 235/462.25 |
| 2003/0101148 A1* | 5/2003 | Montgomery | G07B 17/00508 705/404 |
| 2004/0149830 A1* | 8/2004 | Allen | B41J 2/325 235/494 |
| 2005/0060165 A1* | 3/2005 | Knight | G06Q 10/08 705/22 |
| 2005/0061878 A1* | 3/2005 | Barenburg | G06K 7/1434 235/385 |
| 2005/0194445 A1* | 9/2005 | Takakura | H04N 1/403 235/462.1 |
| 2005/0199723 A1* | 9/2005 | Lubow | G06K 1/18 235/462.01 |
| 2005/0269416 A1* | 12/2005 | Sussmeier | G06K 7/12 235/494 |
| 2006/0150113 A1* | 7/2006 | Natsume | G06K 7/10722 715/763 |
| 2006/0215931 A1* | 9/2006 | Shimomukai | G06K 1/121 382/284 |
| 2006/0232060 A1* | 10/2006 | Tucker | B42D 15/006 283/101 |
| 2008/0017722 A1* | 1/2008 | Snyder | G06Q 10/00 235/494 |
| 2008/0023546 A1* | 1/2008 | Myodo | G06K 7/14 235/462.04 |
| 2008/0290174 A1* | 11/2008 | Norrby | G09F 3/0291 235/487 |
| 2009/0166438 A1* | 7/2009 | Sanchez | B07C 3/18 235/494 |
| 2009/0302115 A1* | 12/2009 | Dowling | G06K 7/00 235/462.01 |
| 2011/0029429 A1* | 2/2011 | Whitehouse | G06Q 20/10 705/39 |
| 2011/0233284 A1* | 9/2011 | Howard | G06K 19/06037 235/494 |
| 2012/0286031 A1* | 11/2012 | Rothschild | G06K 19/06056 235/375 |
| 2013/0092738 A1* | 4/2013 | Blasinski | G06K 19/0614 235/462.04 |
| 2013/0112760 A1* | 5/2013 | Schory | G06K 19/06112 235/494 |
| 2013/0157760 A1* | 6/2013 | Boudville | G06K 7/12 463/31 |
| 2013/0222444 A1* | 8/2013 | Cummins | B41J 3/4073 347/4 |
| 2015/0116510 A1* | 4/2015 | Chien | G06Q 30/0267 348/207.2 |
| 2015/0317923 A1* | 11/2015 | Edmonds | G02B 5/208 40/541 |
| 2015/0320314 A1* | 11/2015 | Berger | A61B 5/0004 340/870.07 |
| 2015/0339838 A1* | 11/2015 | Friedman | G06K 7/1417 345/641 |
| 2015/0358164 A1* | 12/2015 | Carter | G09C 5/00 713/179 |
| 2016/0042263 A1* | 2/2016 | Gaddam | G06K 19/06037 235/494 |
| 2016/0058996 A1* | 3/2016 | Hoss | A61N 1/025 607/5 |
| 2016/0086193 A1* | 3/2016 | Hulaj | G06Q 30/018 705/26.35 |
| 2016/0098581 A1* | 4/2016 | Mart Ascencio | G06Q 10/087 340/5.82 |
| 2017/0220916 A1* | 8/2017 | Zhao | G06K 19/06028 |
| 2017/0309104 A1* | 10/2017 | Lewis | G07D 7/20 |
| 2019/0171853 A1* | 6/2019 | Gao | G06T 5/007 |

\* cited by examiner

2D BARCODE OVERLAYS

BACKGROUND

The present invention relates to overlaying a 2D barcode on text or on another barcode, and more specifically, to overlaying the 2D barcode such that the underlying text or barcode is still readable.

Barcodes can be used to convey product information, shipping information, location information, inventory tracking, and the like. In some situations, especially with shipping labels, space for barcodes is limited. For example, a shipping label may have fixed dimensions which limit the number and size of the barcodes on the label. The barcodes also can have a minimum size that is set based on the type of the scanner being used to read the barcodes on the shipping label as well as the distance from the label to the camera. For example, to a read a barcode with a 20 megapixel camera that is one foot away, a two dimensional (2D) barcode may have a minimum size of two inches by two inches. However, to read a barcode with an eight megapixel camera that is one foot away, the 2D barcode may have a minimum size of seven inches by seven inches, which may take up the entire shipping label leaving no room for other barcodes.

DETAILED DESCRIPTION

Embodiments herein describe a 2D barcode (referred to herein as the overlaid 2D barcode) that overlays text or graphics (e.g., another barcode) while permitting the underlying text or underlying barcode to be read by a user or a barcode scanner. Further, the embodiments herein describe techniques for separating the overlaid 2D barcode from the underlying text or graphics so that the overlaid 2D barcode can be identified and decoded.

In one embodiment, the blocks forming the overlaid 2D barcode are printed (or displayed) using an shade of a color while the text or graphics are printed (or displayed) using a darker shade of that same color. For example, a shipping label may include a white background on which the overlaid barcode and text and other barcodes (e.g., 1D or 2D barcodes) are printed. The text and one or more other barcodes may be printed using black while the overlaid barcode is printed using a grey (i.e., a lighter shade of black). The shade of grey for the overlaid barcode can be selected such any place where the blocks of the overlaid barcode overlap the text, the text remains readable to a human or a computer vision system. Further, the shade of grey of the overlaid barcode may be ignored when a scanner scans one of the other barcodes in the label. Put differently, the scanner may associate the grey used to form the overlaid barcode as white (e.g., the background color). As such, the overlaid barcode does not affect the readability of the barcode it overlays.

The overlaid barcode may have larger dimensions than other barcodes on the same substrate. In fact, increasing the size of the overlaid barcode may result in better accuracy when reading the barcode since the corresponding blocks in the barcode are increased thereby reducing the likelihood the blocks are occluded or filled by the text or graphics on the substrate which are darker. Increasing the size of the overlaid barcode also means the barcode can be read using readers with smaller resolution (e.g., a 8 megapixel camera rather than a 20 megapixel camera) which can reduce costs, or that the barcodes can be read from greater distances relative to the smaller sized barcodes on the same substrate.

Figure 1:
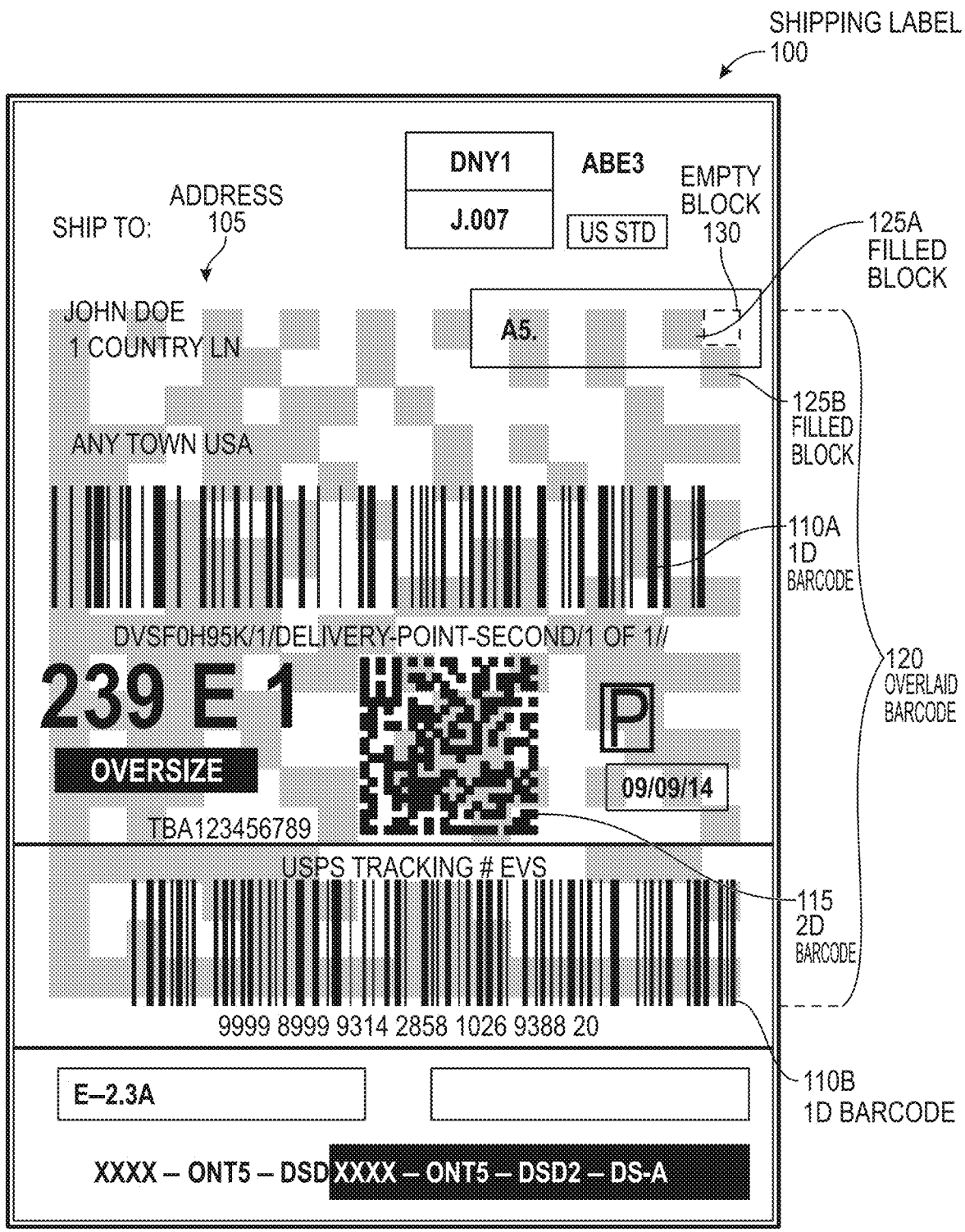
FIG. 1 illustrates a 2D barcode overlaying text and other barcodes in a shipping label, according to one embodiment described herein.

FIG. 1 illustrates a 2D barcode 120 overlaying text and other barcodes 110 and 115 in a shipping label 100, according to one embodiment described herein. The shipping label 100 can include a substrate or physical medium suitable for printing—e.g., paper. The text, graphics, and barcodes shown in FIG. 1 can be applied to the substrate using any type of printer such as a laser printer, inkjet printers, plotters, dot-matrix printers, and the like. Further, the label 100 may include an adhesive on the reverse side of the substrate shown in FIG. 1 which may enable the label 100 to be attached to a package—e.g., a box or envelope. However, in another embodiment, instead of generating a physical label, the information illustrated in FIG. 1 can be displayed electronically on a display—e.g., a monitor, tablet, smart phone, etc.

The overlaid barcode 120 is a 2D barcode that includes blocks that encode data. Although a data matrix type 2D barcode is shown, the overlaid barcode 120 can be any 2D barcode such as a QR code, PDF417, AZTEC, etc. Depending on which of the blocks are filled with the color and shade assigned to the barcode 120, and which are not, determines the encoded data. For example, filled block 125A illustrates a portion of the overlaid barcode 120 that is filled with the color (grey in this example) assigned to the overlaid barcode 120. In contrast, empty block 130 illustrates another portion of the overlaid barcode 120 that is empty—i.e., not filled with the assigned shade. The empty blocks 130 may be assigned the same shade and color as the background of the label 100—e.g., white in this example. Although square shaped blocks are described herein, the 2D barcode may have different types of filled portions and empty portions which can have any shape—e.g., triangular, circular, rectangular, etc. These filled and empty portions can be arranged in rows and columns in a checkboard pattern as shown in FIG. 1 or can be arranged in staggered or interleaved patterns.

As described later, using captured images of the shipping label 100, the overlaid barcode 120 can be separated from the text and other barcodes in the label 100 (e.g., the barcodes 110 and 115) when being read. In one embodiment, the overlaid barcode 120 is a 2D barcode that supports error correction techniques so that if one or more of the filled/empty blocks are misread, the data can still be decoded. The decoded data may have information regarding a destination of a package on which the shipping label 100 is disposed, contents of the package, a route that should be used when moving the package, and the like.

As shown, the overlaid barcode 120 has many different filled and empty blocks 125 and 130 which overlay or share the same location in the shipping label 100 as text, graphics, and other barcodes. For example, the filled block 125B includes a portion of a graphic extending through its middle. As such, the overlaid barcode 120 and the graphic, text, other barcodes are destructively combined. Nonetheless, the overlaid barcode 120 and graphic, text, and other barcodes in the label 100 remain readable to a human or a computer vision system (e.g., a barcode reader). In one embodiment, the shade of the color assigned to the text, graphics, and other barcodes in the shipping label 100 is darker than the shade of the filled blocks 125 for the overlaid barcode 120. Further, in one embodiment, the overlaid barcode 120 is assigned the same color (e.g., black/white) but a different shade (e.g., a light grey) from the text, graphics, and other barcodes in the label (e.g., darker grey). However, the embodiments herein can work if the color assigned to the overlaid barcode 120 is different than the color assigned to the other text, graphics, and other barcodes in the label 100. However, different colors can have different luminance values when detected by a barcode scanner. While other colors can be used, the luminance values of the colors should be selected such that the filled blocks 125 still have a luminance value that is less than the luminance value of the text or barcode they overlay. One advantage of using the same color is that the printer generating the label 100 can print only in one color rather than multiple colors.

In one embodiment, the color and shade assigned to the overlaid barcode 120 is selected so as not to destroy the readability of the text and other barcodes on the label 100. For example, although several filled blocks 125 of the overlaid barcode 120 occlude or overlap the address 105, the text of the address 105 is still readable to a human. Further, the 1D barcodes 110A and 110B and the 2D barcode 115 are both overlapped by several filled blocks of the overlaid barcode 120. Nonetheless, as shown later, these filled blocks can be filtered out and ignored by barcode scanners that read the 1D barcodes 110A and 110B and the 2D barcode 115.

Although FIG. 1 illustrates a shipping label 100, the techniques described herein (e.g., overlaying a 2D barcode on text, graphics, or other barcodes) can be applied in many different situations. For example, a 2D barcode can overlay a signature block in a displayed document. When scanned—e.g., by capturing an image of the displayed document or a printed version of the document—a barcode reader can verify that the document is authentic. In another example, the 2D barcode can overlay text that includes instructions or information for a human that handles an item on which the barcode is disposed, while the 2D barcode provides instructions to an automated system that processes the item. Moreover, although the text in FIG. 1 includes words, other examples of text include other types of images or symbols that convey a meaning to a human when viewed such as a warning symbol, picture of a hand gesture, an emotionally expressive graphic, and the like.

Figure 2:
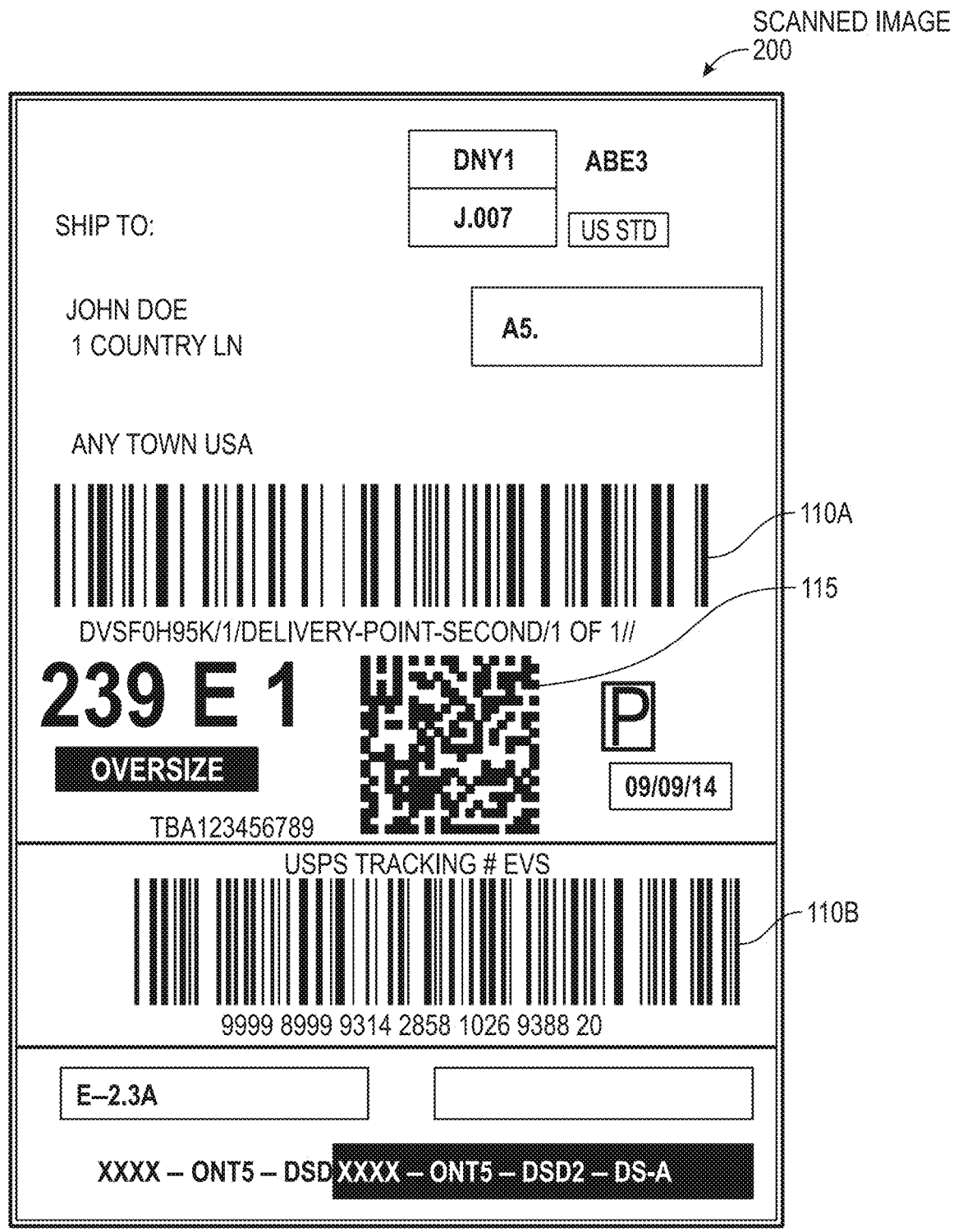
FIG. 2 is a scanned image of the shipping label in FIG. 1, according to one embodiment described herein.

FIG. 2 is a scanned image 200 of the shipping label 100 in FIG. 1, according to one embodiment described herein. In one embodiment, the scanned image 200 is captured by a barcode reader that attempts to read the other barcodes in the shipping label 100 in FIG. 1 such as the 1D barcodes 110A and 110B or the 2D barcode 115. As shown by comparing the scanned image 200 to the shipping label 100 in FIG. 1, this barcode reader processes the scanned image 200 such that the blocks associated with the overlaid barcode have been removed.

In one embodiment, the barcode reader that reads the barcodes 110 and 115 has a predefined threshold for evaluating the pixels in the scanned image 200. To process the image 200 quickly, the barcode reader identifies an intensity value of each pixel in the image 200 and if the pixel intensity value is at or above the threshold, the intensity value for that pixel is changed to a maximum intensity value, but if the pixel intensity value is below the threshold, the intensity value for the pixel is changed to a minimum intensity value. In this example, the maximum intensity value is white while the minimum intensity value is black. Further, white and black are considered the same color, but different shades of that color.

In FIG. 1, the filled blocks 125 of the overlaid barcode 120 are set to an intermediate intensity value (e.g., grey, which is a shade between white and black). In one embodiment, the intermediate intensity value is between the intensity value assigned to the text and barcodes 110 and 115 and the intensity value assigned to the empty blocks 130 and the background of the shipping label 100 (e.g., white). Further, in one embodiment, the intermediate intensity value is between the threshold used by the barcode reader that reads the barcodes 110 and 115 and white—e.g., the maximum intensity value. Thus, whenever the barcode reader identifies a pixel in the scanned image 200 with the intermediate intensity value, because this value is greater than the threshold (which may be set at the intensity value that is in the middle between white and black), the barcode reader converts the intensity value to the shade corresponding to white. Thus, in FIG. 2, all of the grey filled blocks 125 shown in FIG. 1 have disappeared or been removed by the barcode reader. Thus, the barcode reader can now process the image 200 as it would normally.

Using the threshold (also referred to as a "cut threshold" or "cut line") to drive the intensity value for each pixel in the image 200 to the maximum and minimum values is standard in many barcode readers. As such, the barcode readers configured to read the barcodes 110 and 115 may not need to be reconfigured or need to change their operation in order to accommodate the overlaid 2D barcode. Put differently, as part of their normal processing, the barcode readers may ignore the grey filled blocks of the overlaid barcode.

In one embodiment, the intermediate intensity value of the filled blocks in the overlaid barcode is set as far as possible from the threshold used by the barcode readers that read the barcodes 110 and 115 and from the maximum intensity value. In one embodiment, the intermediate intensity value may be selected at the intensity value that is in the middle between the cut threshold (which may be at the middle between the minimum and maximum intensity value) and the maximum intensity value. Doing so decreases the likelihood that the barcode reader mistakenly reads the filled pixels in the overlaid barcode as being below the threshold (and thus, the pixels are converted to black rather than to white as desired). Further, keeping the intermediate intensity value as far from the maximum intensity value (e.g., white) prevents the filled blocks from blending into the background, which may make the computer vision process described later used to identify and decode the overlaid barcode more accurate and reliable.

Figure 3:
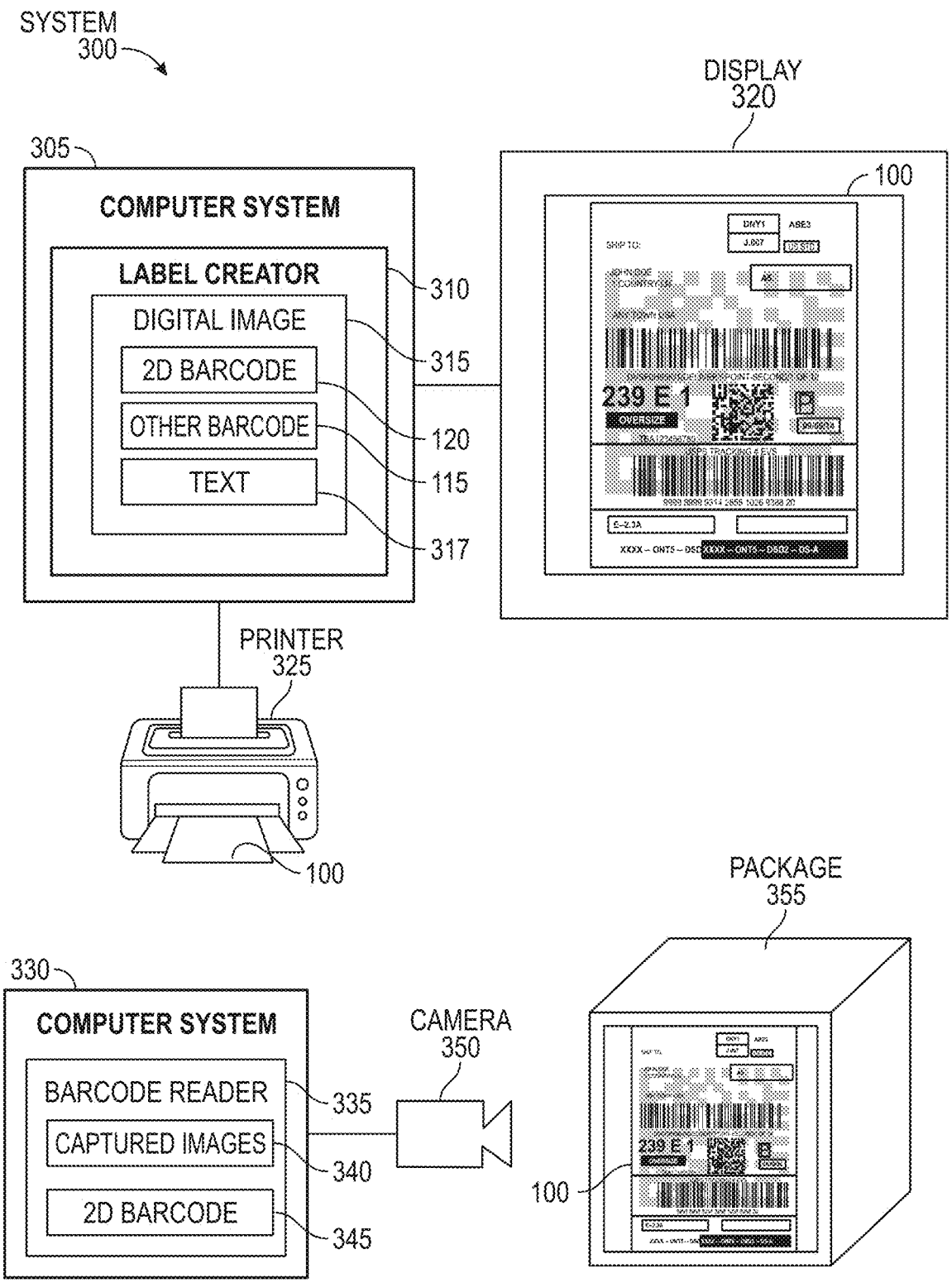
FIG. 3 is a system for generating and decoding overlaid 2D barcodes, according to one embodiment described herein.

FIG. 3 is a system 300 for generating and decoding overlaid 2D barcodes 120, according to one embodiment described herein. The system 300 includes a computing system 305 for generating digital images 315 that include the overlaid 2D barcodes 120 which can then be printed or displayed. As shown, the computing system 305 includes a label creator 310 (e.g., a software application) which receives or generates the 2D barcodes 120. The label creator 310 overlays the 2D barcode 120 over another barcode 115 or text 317 in a digital image 315. In one embodiment, the digital image 315 includes data formatted for a printer 325. That is, the computing system 305 transmits the digital image 315 to the printer 325 which uses the digital image 315 to a print out a physical shipping label 100. Alternatively, the digital image 315 may be formatted for display on a display 320. In this case, the display 320 can output a digital representation of the shipping label 100 which includes the scannable barcodes 120 and 115 along with the text 317. As mentioned above, the embodiments herein specifically illustrate a shipping label 100 but this is only one example where a 2D barcode 120 may overlay text 317 and/or other barcodes 115.

A computing system 330 includes a barcode reader 335 (e.g., a software application such as a computer vision program) for reading the 2D overlaid barcode 120 in the shipping label 100. In this example, the shipping label 100 is attached to a package 355 but could be disposed on any item. A camera 350 captures an image of the shipping label 100 which is then digitized and transmitted to the barcode reader 335. Although FIG. 3 illustrates the camera 350 capturing an image of the label 100 on the package 355, the camera 350 could also read the barcodes displayed on the display 320. As mentioned above, because the 2D overlaid barcode 120 may be larger than the other barcodes 115 (e.g., the barcode 120 may extend along the entire width and/or length of the shipping label 100), the camera 350 can be further away from the shipping label 100 than it would be otherwise, or the camera 350 can be a lower resolution camera 350, thereby reducing cost.

The barcode reader 335 processes images 340 captured by the camera 350 to identify the 2D barcodes 345. As described in detail below, the reader 335 processes the captured images 340 to separate the 2D barcode 345 from the text 317 and/or other barcodes 115 which are overlaid or occluded by the 2D barcode 345. Once separated, the barcode reader 335 can decode the 2D barcode 345 to identify information represented by the barcode 345. Although not shown, the system 300 may include a separate barcode reader and camera for reading the other barcodes 115 in the shipping label 100. However, in other embodiments, the barcode reader 335 and the camera 350 may be capable of processing the captured images 340 to independently identify both the 2D barcode 120 and the other barcodes 115.

Figure 4:
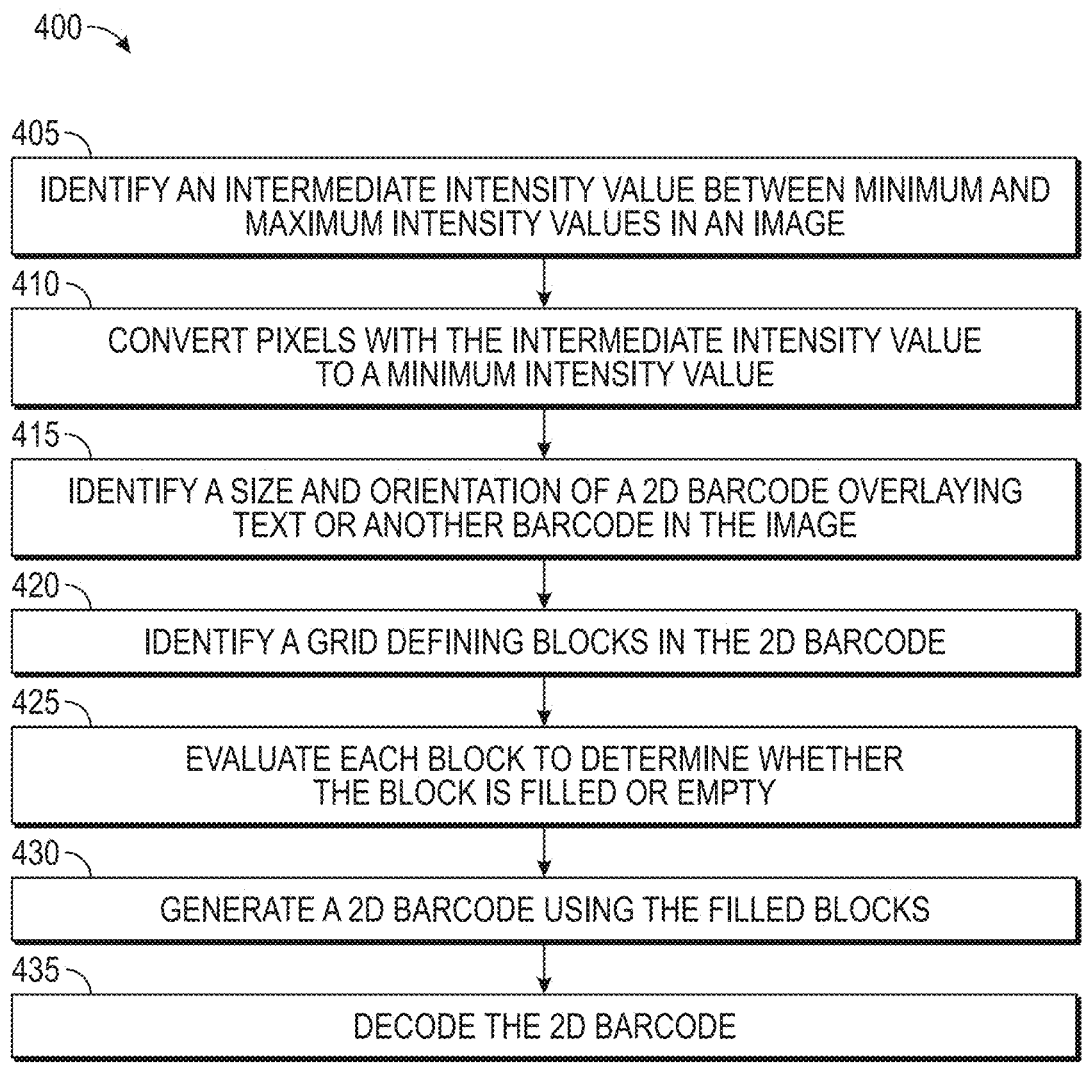
FIG. 4 is a flowchart for separating an overlaid 2D barcode from underlying text or graphics, according to one embodiment described herein.

FIG. 4 is a flowchart of a method 400 for separating an overlaid 2D barcode from underlying text or graphics, according to one embodiment described herein. At block 405, the barcode reader identifies an intermediate intensity value between minimum and maximum intensity values in an image captured by a camera. In one embodiment, the image may be an image of the shipping label 100 shown in FIG. 1. However, in other embodiments, the image may be 2D barcode that overlays text or a graphic.

In one embodiment, the minimum, intermediate, and maximum intensity values are shades of the same color. Although black is specifically used herein since many printing systems use black ink, the embodiments herein are not limited to such and can be used with any color. Further, the embodiments herein could be used if the intensity values are of different colors (again, making sure that the luminance values of the color used for the filled blocks in the 2D barcode is different than the luminance value of the color used for other barcodes, text, or graphics). For example, the 2D barcode may be assigned a different color from the text or other barcodes that it overlays which may improve the ability of a human to read the text. The 2D barcode can nonetheless have a different shade from the text and the background of the image.

Figure 5:
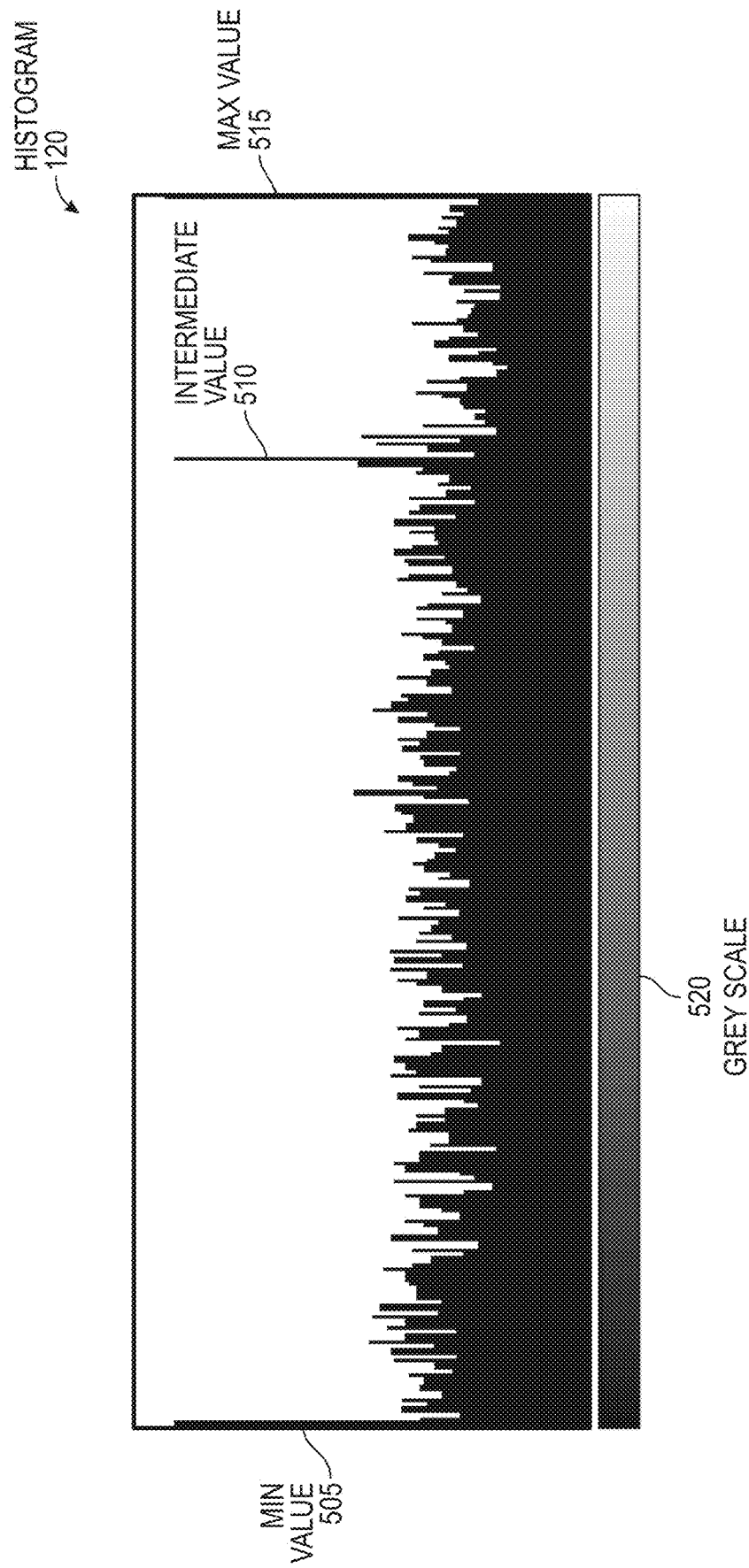
FIG. 5 is a histogram of intensity values derived from an image of the shipping label in FIG. 1, according to one embodiment described herein.

FIG. 5 is a histogram 500 of intensity values derived from an image of the shipping label in FIG. 1, according to one embodiment described herein. Although FIG. 1 illustrate three distinct shades (e.g., black which is used by text and the barcodes, white which is the background, and grey which is used by the filled blocks of the overlaid barcode), a real-life image of the shipping label 100 may result in pixels with a variety of shades as illustrated by the histogram 500. A greyscale 520 along the X-axis indicates the shade of the pixels while the Y-axis indicates the number of pixels with a particular shade.

There are three peaks in the histogram 500 which correspond to the three shades in FIG. 1: a minimum intensity value 505 which are all the black pixels in the captured image, an intermediate intensity value 510 which are all the grey pixels from the filled blocks of the overlaid barcode, and a maximum intensity value 515 which are all the white pixels forming the background of the captured image. In one embodiment, the barcode reader uses the histogram 500 to identify the three different peak values 505, 510, and 515 of the pixels in the captured image, and mores specifically, to identify the intermediate intensity value 510. However, while a histogram 500 is shown, a barcode reader can use any technique for identifying the intermediate intensity value 510.

Returning to the method 400, at block 410, the barcode reader converts pixels with the intermediate intensity value (e.g., grey) to a minimum intensity value (e.g., black). Doing so converts the pixels in the filled blocks of the overlaid 2D barcode from grey to black. In one embodiment, the barcode reader establishes a cut threshold at or near the intermediate intensity value identified at block 405. For example, the cut threshold may be set at the identified intermediate intensity value, or may be 1-5% above the this intensity value so as to capture pixels that may have an intensity value slightly above the intermediate intensity value which are likely part of the filled blocks shown in FIG. 1. The pixels with intensity values at or below this cut threshold are converted to black while the pixels above the threshold are converted to white. The result of performing block 410 is illustrated in FIG. 6.

Figure 6:
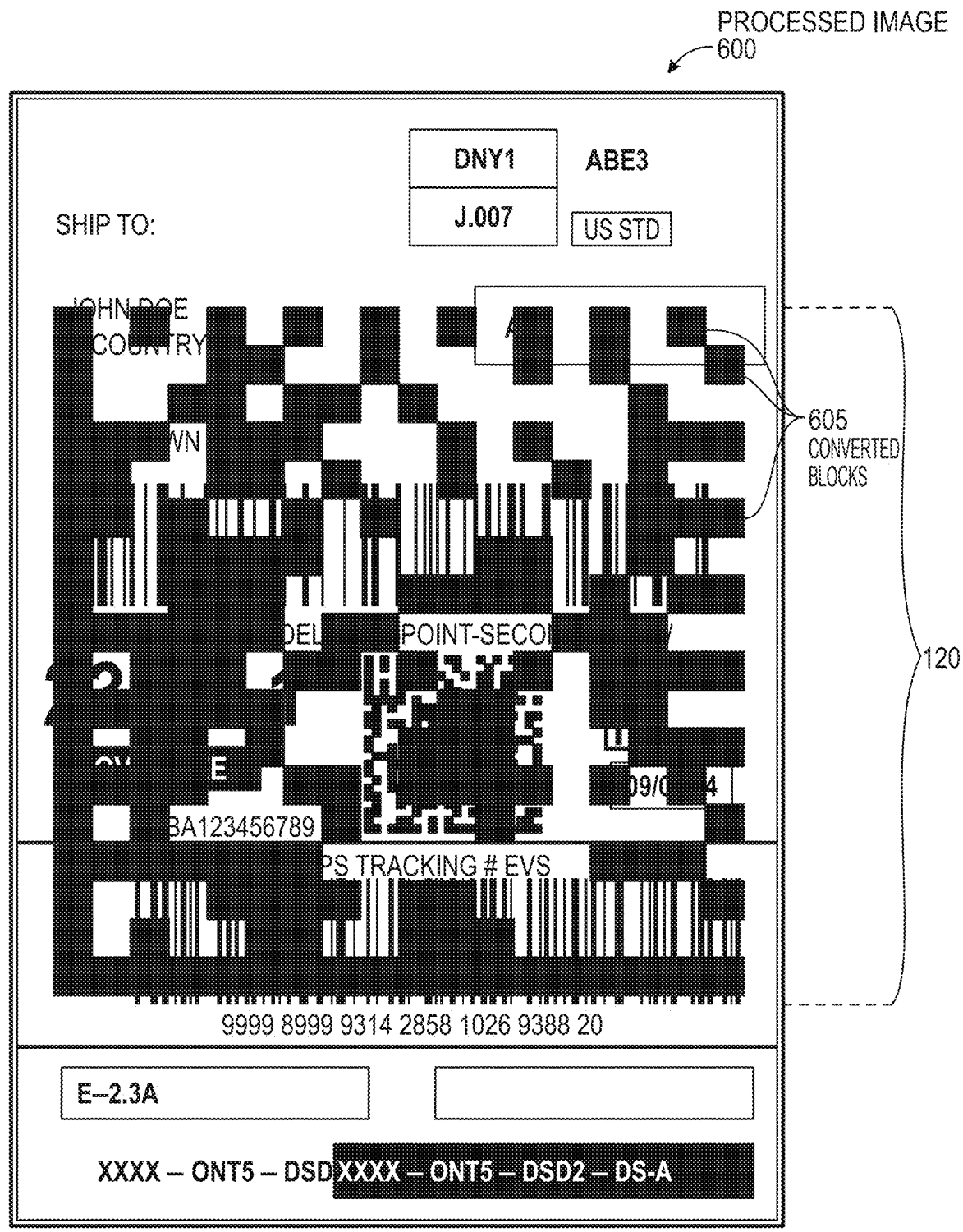
FIG. 6 illustrates converting the pixels of the overlaid 2D barcode to a maximum intensity value, according to one embodiment described herein.

FIG. 6 illustrates converting the pixels of the overlaid 2D barcode 120 to a minimum intensity value in a processed image 600, according to one embodiment described herein. Comparing FIG. 1 to FIG. 6 illustrates that the grey filled blocks 125 are changed into black converted blocks 605 (as illustrated by the hashing). That is, the grey pixels in the captured image are converted to black pixels in the processed image 600. As such, the converted blocks 605 of the overlaid barcode 120 have the same shade (e.g., the minimum intensity value) as the text, graphics, and other barcodes in the image 600.

Figure 7:
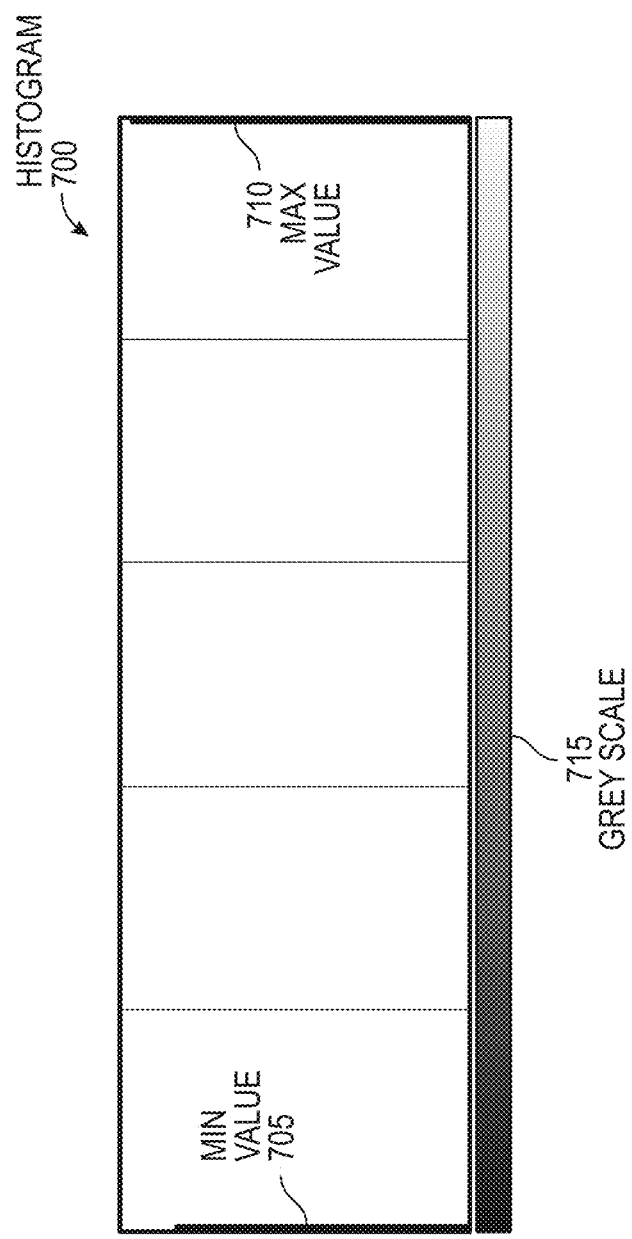
FIG. 7 is a histogram of intensity values of the image shown in FIG. 6, according to one embodiment described herein.

FIG. 7 is a histogram 700 of intensity values of the image shown in FIG. 6, according to one embodiment described herein. As shown, rather than having a distribution of intensity values among the pixels along the greyscale 715, the pixels are assigned either to the minimum intensity value 705 (e.g., black) or the maximum intensity value 710 (e.g., white). In this example, the grey pixels forming the filled blocks of the overlaid 2D barcode are converted to the minimum intensity value 705. Any of the empty blocks in the overlaid 2D barcode (but not the text or graphics in those blocks) are converted to the maximum intensity value 710 (e.g., white) although many of the pixels corresponding to the empty blocks may already be at the maximum value 710.

Returning to the method 400, at block 415, the barcode reader identifies a size and orientation of the 2D barcode overlaying the text or another barcode in the image. Put differently the barcode reader performs further processing on the image 600 in FIG. 6 to identify the length and width (e.g., the boundary or size of the overlaid barcode) and its orientation in the image 600. For example, although in the image 600 the overlaid barcode 120 is shown as being vertical, the image 600 may be rotated relative to the camera, or the image 600 may be skewed if, e.g., a top portion of the shipping label was further from the camera capturing the image 600 relative to a bottom portion of the shipping label. Put differently, the shipping label may not have been completely perpendicular to the view of the camera but may have been angled relative to the camera.

In one embodiment, the barcode reader identifies orientation markings in the processed image to determine the size and orientation of the overlaid barcode. In one example, the orientation markings are predefined areas in the 2D barcode used by an image processing system to identify and decode the barcode.

Figure 8:
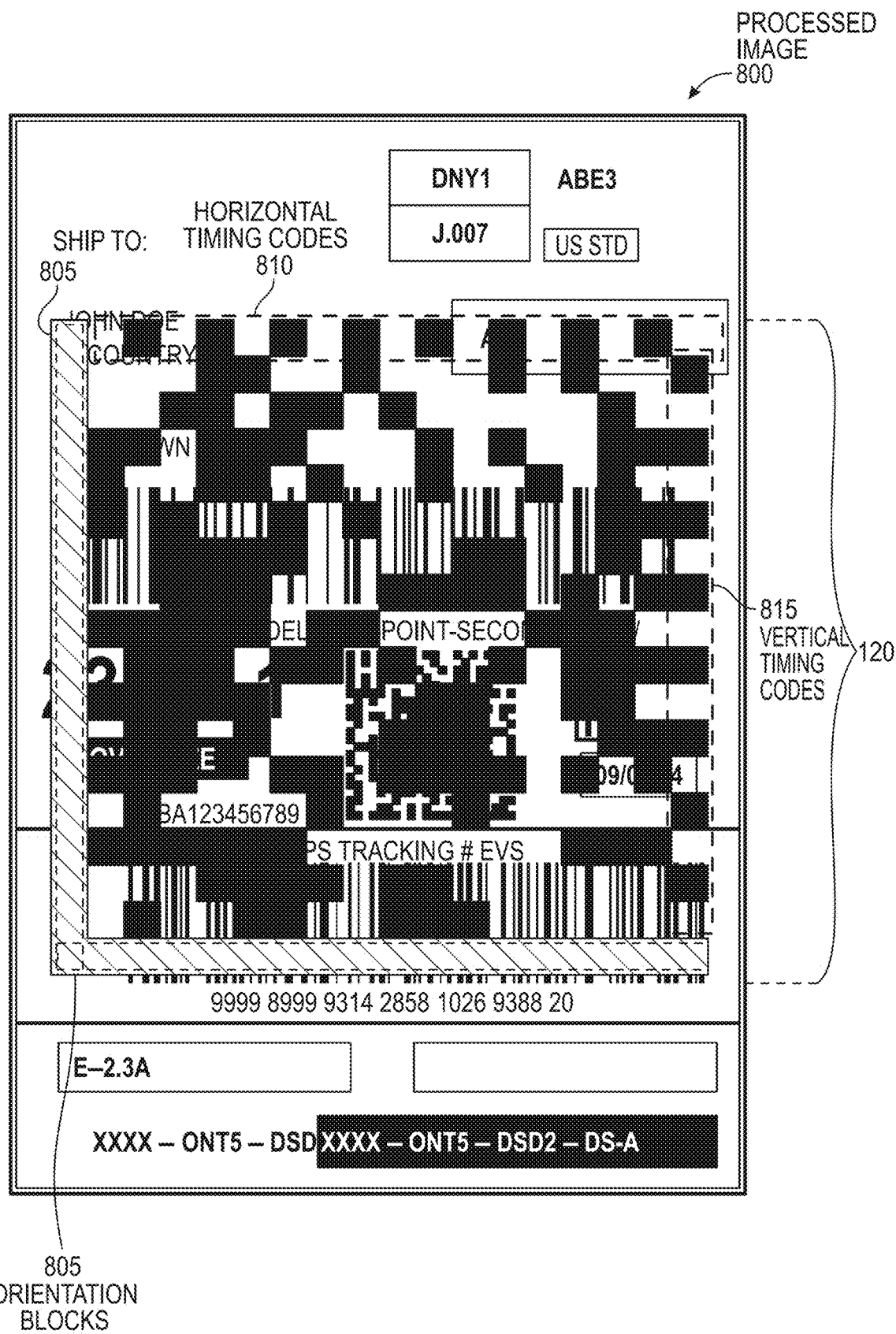
FIG. 8 illustrates orientation markings in the overlaid 2D barcode, according to one embodiment described herein.

FIG. 8 illustrates orientation markings in the overlaid 2D barcode 120, according to one embodiment described herein. In this example, the overlaid barcode 120 includes orientation blocks 805, horizontal timing codes 810, and vertical timing codes 815 which can be used as orientation markings. Specifically, the orientation blocks 805 and the horizontal and vertical timing codes 810 and 815 in FIG. 8 are specific to data matrix 2D barcodes. Other 2D barcodes (e.g., QR codes, PDF417 codes, AZTEC codes) may use different types and arrangements of orientation markings. The method 400 is not limited to any particular type of 2D barcode and can be used with any barcode which enables the barcode reader to determine the orientation and size of the barcode. In one embodiment, the barcode reader can identify orientation markings from multiple different types of barcodes.

Using the orientation blocks 805, the barcode reader determines the orientation of the barcode 120. That is, the barcode reader scans the processed image 800 to determine the two perpendicular blocks which intersect at a right angle. Based on the location of the orientation blocks 805, the barcode reader can determine the rotation of the barcode 120 relative to the camera. Knowing the rotation of the overlaid barcode 120 enables the barcode reader to identify the outer boundaries of the barcode 120. Stated differently, the barcode reader can determine the location in the captured image that contains the overlaid barcode 120.

The barcode reader can use the horizontal and vertical timing codes 810 and 815 to identify the rows and columns of the blocks. In this example, the timing codes are set in an on-off pattern along the top row and rightmost column of the overlaid barcode 120. By identifying the timing codes 810 and 815, the barcode reader can identify each row and column in the barcode 120. Further, by tracking the change in dimensions of the timing codes 810 and 815, the barcode reader can determine whether the barcode 120 was skewed at an angle relative to the camera capturing the image 800. In FIG. 8, it is assumed the barcode 120 was perpendicular to a field of view in the camera, and as such, the dimensions of the blocks in the horizontal and vertical timing codes 810 and 815 are essentially constant. However, if the dimensions of the blocks forming the timing codes 810 and 815 changes, this may indicate the shipping label was not perpendicular to the camera. For example, the length (or height) of the blocks at the top of the vertical timing codes 815 may be smaller than the length of the blocks at the bottom of the vertical timing codes 815 which may indicate that the bottom portion of the barcode 120 was closer to the camera when the image 800 was captured (and thus, the blocks appear larger in the image 800) than the top portion of the barcode 120.

Returning to the method 400, at block 420 the barcode reader identifies a grid defining blocks in the 2D barcode. In one embodiment, the barcode reader uses the orientation and size of the barcode determined at block 415 to superimpose a grid onto the region containing the barcode in the captured image.

Figure 9:
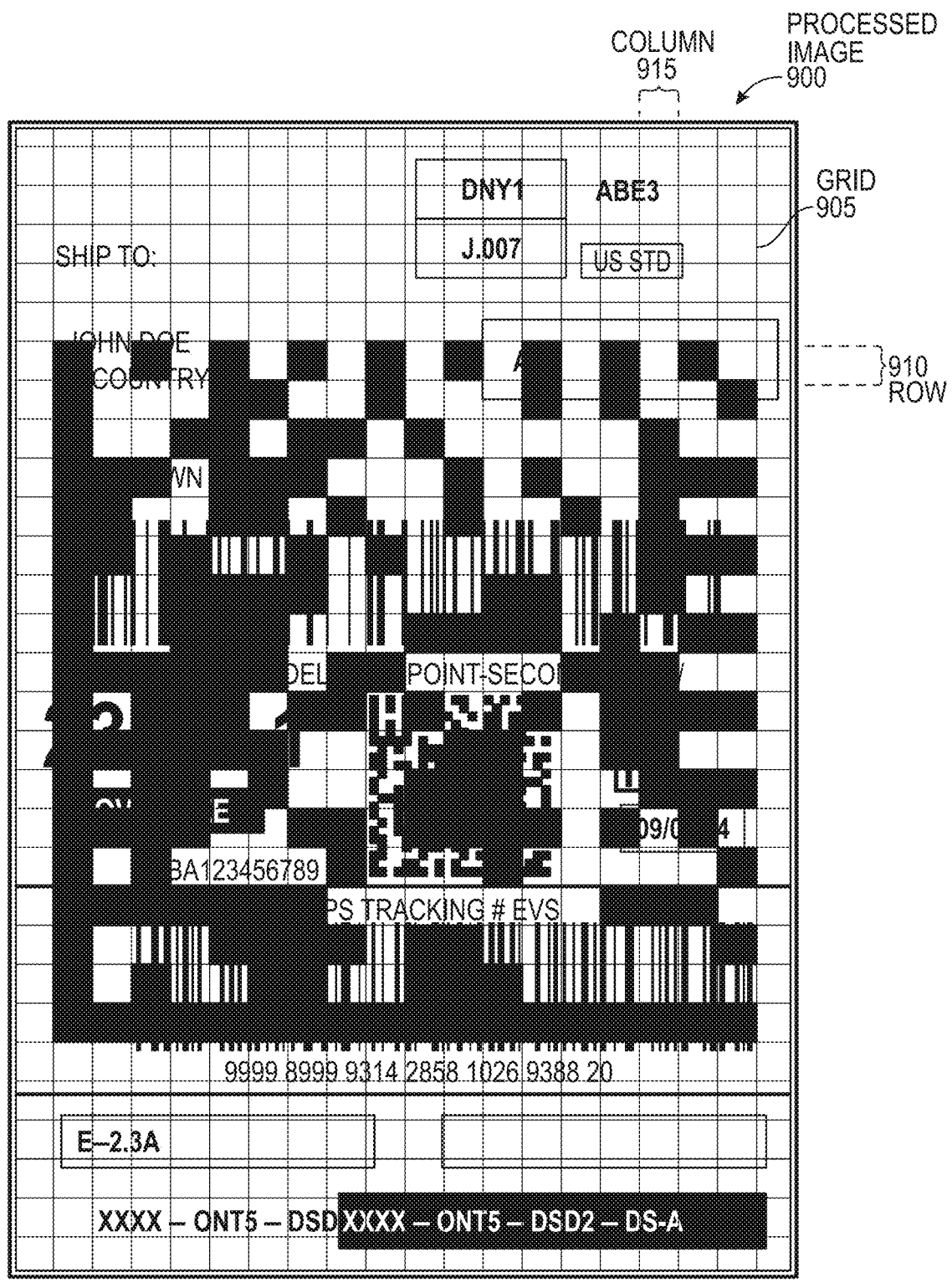
FIG. 9 illustrates a grid defining blocks in the overlaid 2D barcode, according to one embodiment described herein.

FIG. 9 illustrates a grid 905 defining blocks in the overlaid barcode, according to one embodiment described herein. As shown, the grid 905 divides the processed image 900 into rows 910 and columns 915. The grid 905 can be arranged on the image to match the orientation and size of the overlaid barcode. For example, if the overlaid barcode is rotated, the grid 905 is similarly rotated. As a result, the locations of the blocks formed by the grid 905 correspond to locations of the blocks of the 2D barcode. Put differently, in the region of the image 900 that includes the overlaid barcode, each location of a block in the grid 905 in this region correspond to a location of one of the blocks in the barcode.

Although the grid 905 is formed using parallel lines in FIG. 9, the lines may not be parallel if the overlaid barcode was not perpendicular to the camera. For example, if the bottom portion of the barcode was closer to the camera than the top portion when capturing the image 900, the vertical lines forming the columns 915 may be spaced further apart at the bottom of the grid 905 (since the blocks of the barcode may be larger at the bottom) than at the top of the grid 905 where the blocks may appear smaller to the camera. A similar change in spacing may occur with the horizontal lines forming the rows 910 if the right side of the barcode was closer to the camera than the left side, or vice versa. The layout and spacing of the vertical and horizontal lines forming the rows 910 and columns 915 of the grid 905 may be determined using the orientation and size information obtained from the orientation markings in the overlaid barcode.

Returning to method 400, at block 425 the barcode reader evaluates each block in the grid to determine whether the block is filled or empty. In one embodiment, the barcode reader identifies the blocks in the grid that correspond to blocks in the overlaid barcode (using the identified dimensions of the barcode) and evaluates each of the those blocks to determine if the blocks were originally a filled block 125 or an empty block 130 as shown in FIG. 1. As can be seen by viewing FIG. 9, the blocks in the grid 905 within in the dimensions of the barcode that are now completely black (as indicated by the hashing) correspond to the grey filled blocks 125 in FIG. 9. However, the blocks in the grid 905 within the dimensions of the barcode that include at least some white in them (e.g., the color or shade of the background in the label) correspond to the empty blocks 130 in FIG. 1. Thus, in one embodiment, the barcode reader evaluates each block in the grid 905 to determine which blocks contain at least some white pixels.

There are several techniques for distinguishing between the blocks in the grid that correspond to the filled blocks 125 and the blocks in the grid that correspond to the empty blocks 130. In one embodiment, the barcode reader may count each pixel within a block to determine how many pixels in the block have the maximum intensity values (e.g., white). The barcode reader can compare the count to a threshold (e.g., ten pixels) since the grid 905 may not perfectly align with the actual blocks of the overlaid barcode. If the barcode reader determines a block exceeds the threshold, the reader determines the block corresponds to an empty block of the overlaid barcode; otherwise, the block corresponds to a filled block of the barcode.

In another example, the barcode reader may sum up the intensity values in the blocks formed by the grid to determine whether these blocks correspond to filled or empty blocks in the barcode. The barcode reader can assign a score to each block based on summing up the intensity values. The scores assigned to the filled blocks (e.g., the completely black blocks) will be similar and likely the most common score. The barcode reader may create a histogram of the scores and then set a threshold that is at or above the most common score. Blocks in the grid with scores greater than the threshold are determined to correspond to empty blocks while the grids less than the threshold correspond to filled blocks.

In one embodiment, the barcode reader uses a weighted summation to determine the scores for each block of the grid. For example, the barcode reader may apply a greater weight to the intensity values that are closer to the maximum intensity value (e.g., the pixels that are closer to white) than to the intensity values that are closer to the minimum intensity value (e.g., the pixels that are closer to black). This weight may be applied exponentially such that, as the number of pixels assigned to white in a particular block increase linearly, the score assigned to the block increases exponentially. Thus, the blocks in the grid with larger numbers of white pixels are emphasized while the blocks with larger numbers of black pixels are deemphasized using the weighted scores.

Figure 10:
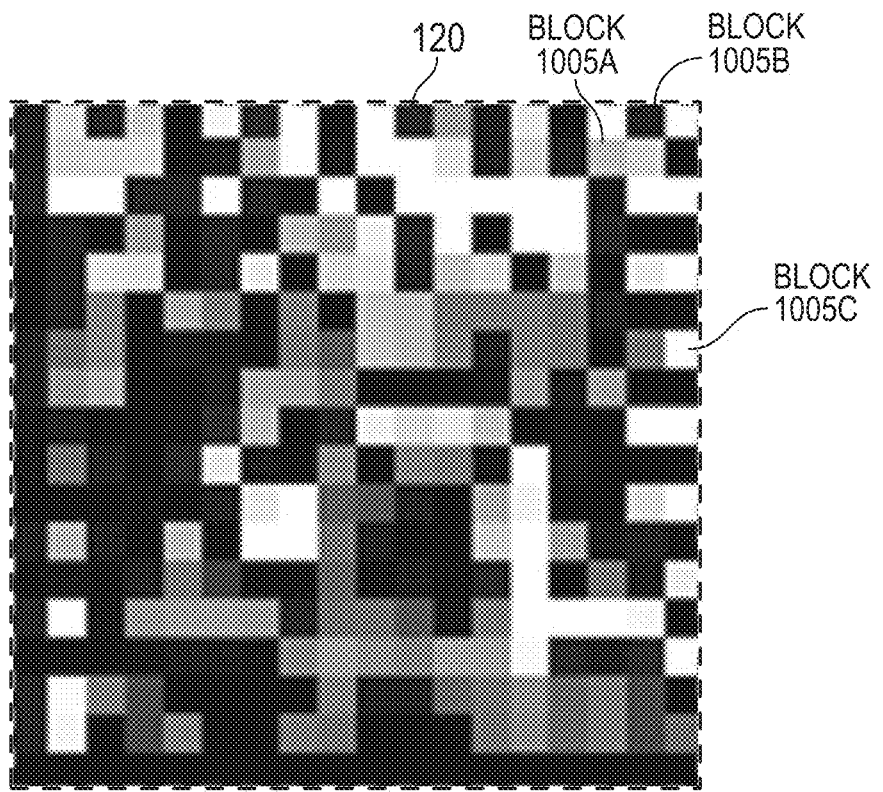
FIG. 10 illustrates performing a summation technique on the pixels in each of the blocks of the overlaid 2D barcode, according to one embodiment described herein.

FIG. 10 illustrates performing a summation technique on the pixels in each of the blocks of the overlaid barcode 120, according to one embodiment described herein. In this example, the intensity values of the pixels in each block 1005 are averaged to arrive at an overall shade for the block 1005. Averaging the intensity values is similar to summing the intensity values (either linearly or using a weight function) as discussed above but with the added step of dividing the summation (or score) by the total number of pixels in the block 1005. For example, the white pixels may have a greater weight or influence on the overall intensity value of the block 1005. In this example, the block 1005A has an intermediate intensity value (e.g., grey) while block 1005B has the minimum intensity value (e.g., black) and the block 1005C has the maximum intensity value (e.g., white).

As above, the intensity values of each block may be compared to a threshold. That is, the intensity value (or greyscale value) for each block can be compared to a threshold to determine whether the block corresponds to a filled or empty block of the overlaid barcode.

Returning to method 400, at block 430 the barcode reader generates a 2D barcode using the filled blocks. That is, the barcode reader can use the block-by-block determination performed at block 425 to then generate a 2D barcode.

Figure 11:
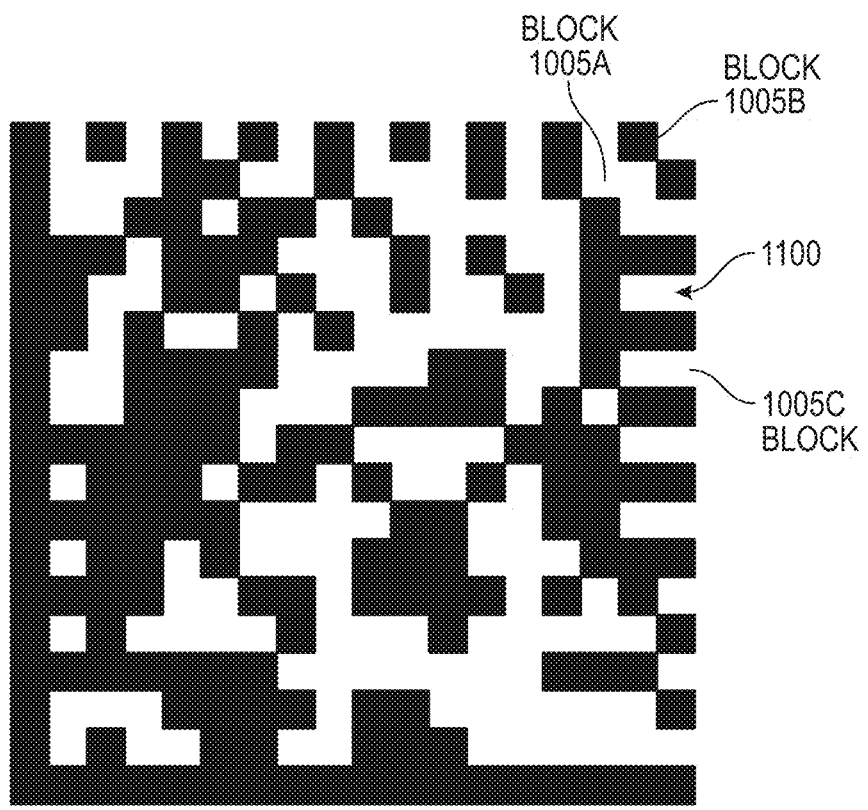
FIG. 11 illustrates converting the blocks with intensity values less than a threshold to a minimum intensity value, according to one embodiment described herein.

FIG. 11 illustrates converting the blocks with intensity values less than a threshold to a minimum intensity value, according to one embodiment described herein. That is, FIG. 11 is a graphical representation of a recovered overlaid barcode 1100 where the blocks in the barcode 1100 are assigned either a maximum or a minimum intensity value. In this example, the portions of the overlaid barcode 1100 which had filled blocks have already been converted to the minimum intensity value (e.g., black). The empty blocks in the overlaid barcode 1100 may be assigned a different shade that can range from minimum intensity value to the maximum intensity values as indicated by the various greys shown in FIG. 10. The barcode reader converts these grey blocks that have intermediate intensity values (which correspond to the empty blocks 130 in FIG. 1) to the maximum intensity value (e.g., white). That is, the empty blocks in the overlaid barcode 120 which can include portions of text, graphics, and other smaller barcodes have been changed to the maximum intensity value (e.g., white in this example). Stated differently, the text, graphics, and other barcodes in the empty blocks which may be black in the original label have been removed from the empty blocks of the overlaid barcode 1100. This can be seen by comparing FIG. 10 and FIG. 11 where the block 1005A in FIG. 10 is converted to a white block 1005A in FIG. 11. The black block 1005B and the white block 1005C, however, remain unchanged. By removing the overlaid text, graphics, and other barcodes from the empty blocks, the overlaid barcode 1100 (which may be a digital file or digital stream of data) can be decoded by the barcode reader.

Figure 12:
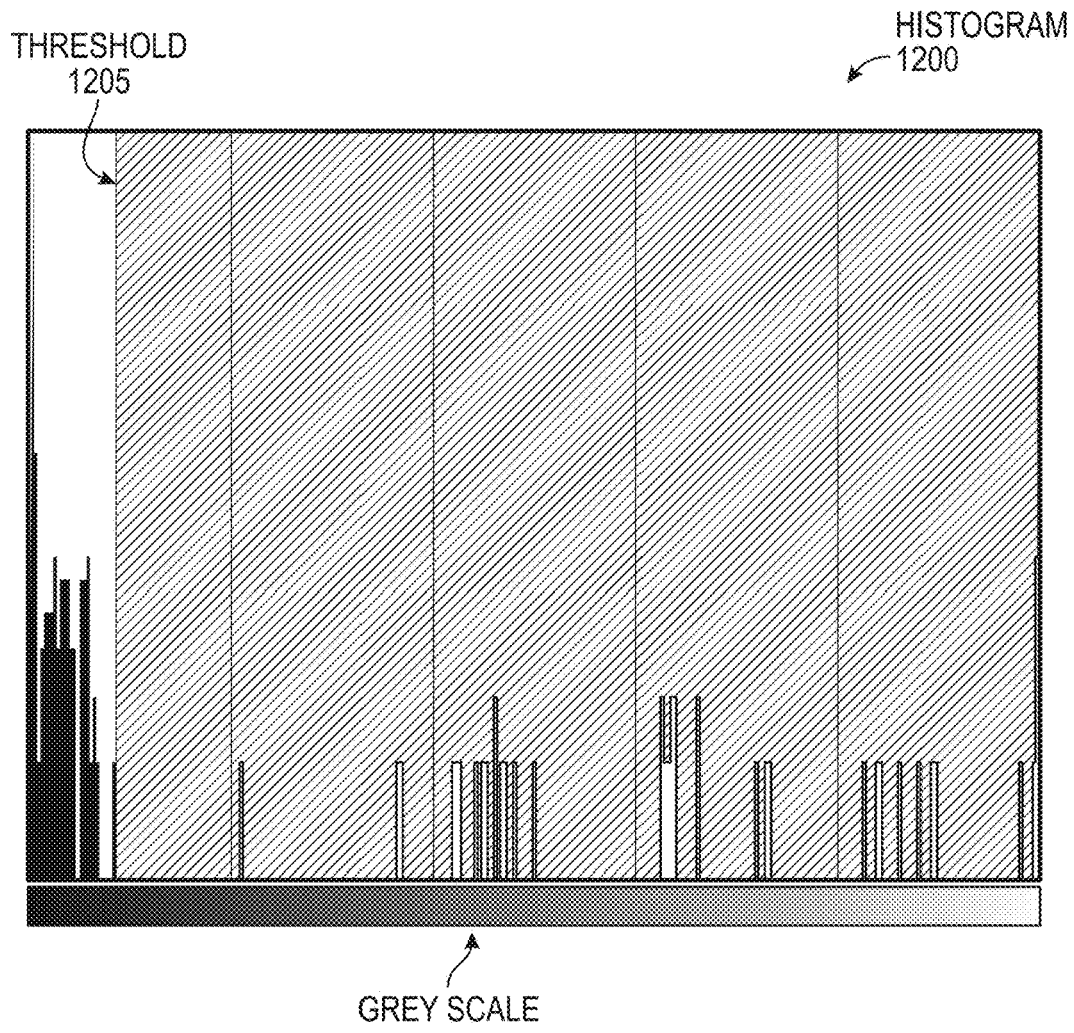
FIG. 12 is a histogram of the intensity values of the blocks in FIG. 10, according to one embodiment described herein.

FIG. 12 is a histogram 1200 of the intensity values of the blocks in FIG. 10, according to one embodiment described herein. The histogram 1200 includes a greyscale along the X-axis while the Y-axis indicates the number of blocks in FIG. 10 with the corresponding greyscale value. The large number of black blocks at, or near, the left of the histogram 1200 corresponds to the filled blocks of the overlaid barcode that were previously converted from the intermediate intensity value to black. The histogram 1200 indicates that the remaining blocks (e.g., the empty blocks of the overlaid barcode) are distributed across the greyscale depending on the percentage of the blocks that includes portions of text, graphics, and other barcodes.

The histogram 1200 illustrates a threshold 1205 that can be used to perform the conversion illustrated in FIG. 11 where the blocks that have a greyscale value to the right of the threshold 1205 are deemed to be filled blocks and are converted to the maximum intensity value—e.g., white— while the blocks to the right of the threshold 1205 are deemed to be empty blocks and are unchanged, or are converted to the minimum intensity value—e.g., black. The threshold 1205 may be set by a user or by the barcode reader using a predefined algorithm. For example, the barcode reader may evaluate the data represented by the histogram 1200 to identify the wide separation from the black blocks and the remaining grey blocks. This wide separation may be a result of emphasizing or heavily weighting the white pixels when determining a score for each block. The barcode reader can then place the threshold 1205 in the region with the wide separation. Of course, this is just one example of dynamically setting the threshold 1205 and the embodiments herein are not limited to such.

Returning to method 400, at block 435 the barcode reader decodes the 2D barcode (e.g., the overlaid barcode) generated at block 430. In one embodiment, the 2D barcode include blocks that are completely filled or completely empty. That is, each block in the 2D barcode may have only one intensity value such that if the 2D barcode were displayed or printed, the barcode blocks would look like FIG. 11. In one embodiment, each block in the barcode is assigned either a maximum or minimum intensity value where the pixels (or sub-regions) in any one of the blocks all have the same value.

Figure 13:
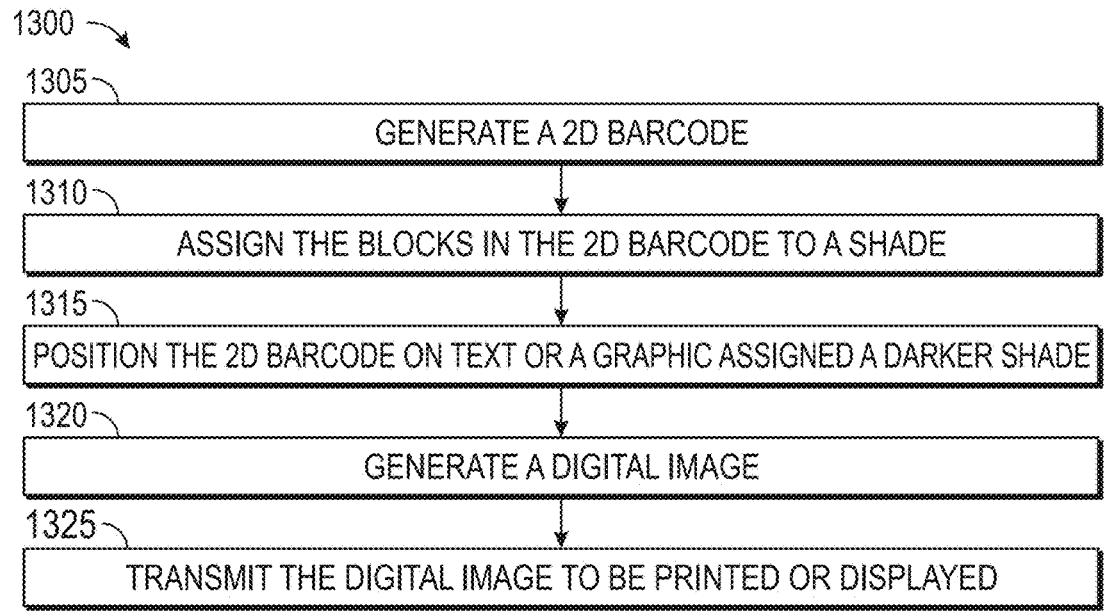
FIG. 13 is a flowchart for generating a digital image containing an overlaid 2D barcode, according to one embodiment described herein.

FIG. 13 is a flowchart of a method 1300 for generating a digital image containing an overlaid 2D barcode, according to one embodiment described herein. At block 1305, a label creator generates a 2D barcode which will be overlaid text, graphics, or other barcodes. The 2D barcode may provide additional tracking location for a package, metadata about the other barcodes, provide security information, or authenticate a document.

At block 1310, the label creator assigns the filled blocks in the 2D barcode to a shade—e.g., an intermediate intensity value. The empty blocks in the 2D barcode may be assigned to a background color of the label (e.g., white) which may be a maximum intensity value. For example, the 2D barcode and the text, graphics, or other barcodes it overlays may be the same color but be assigned different shades of that color. However, the 2D barcode can also be assigned a different color than the text, graphics, or other barcodes it overlays.

At block 1315, the label creator positions the 2D barcode on text or a graphic that is assigned a darker shade than the shade of the 2D barcode. That is, the text or graphics can be within the empty and filled blocks of the 2D barcode. However, because the text or graphics have a darker shade than the empty and filled blocks, the text and graphics can still be read by a human or by a barcode reader as described above.

At block 1320, the label creator generates a digital image that includes the 2D barcode overlaying at least a portion of text, graphics, or other barcodes that have a darker shade. At block 1325, the label creator transmits the digital image to a printer or a display controller (e.g., a display adapter or interface).

Figure 14:
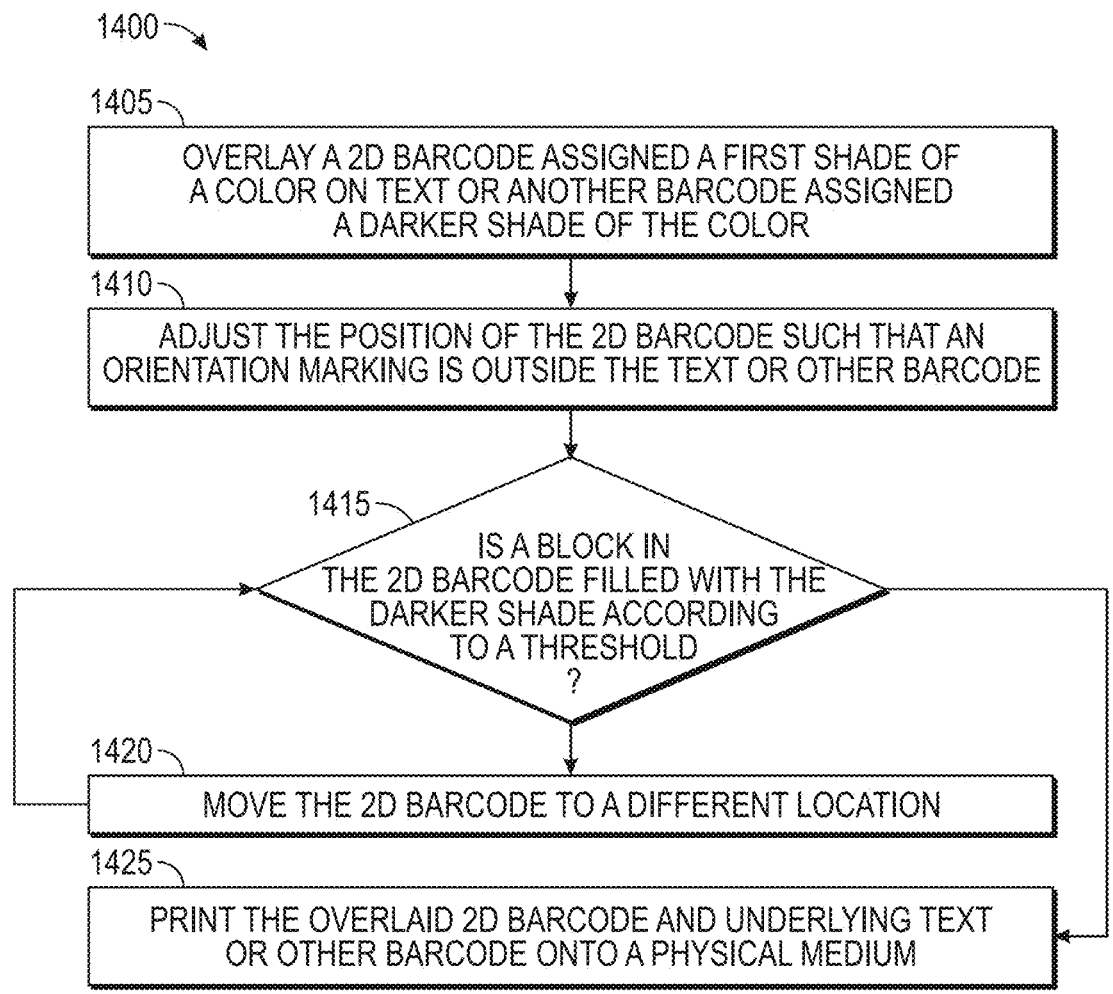
FIG. 14 is a flowchart for optimizing a position of a 2D barcode when overlaying text or graphics, according to one embodiment described herein.

FIG. 14 is a flowchart of a method 1400 for optimizing a position of a 2D barcode when overlaying text or graphics, according to one embodiment described herein. At block 1405, the label creator overlays a 2D barcode assigned a first shade onto text or another barcode assigned a darker shade. One example of such an arrangement is shown by the label 100 in FIG. 1.

At block 1410, the label creator adjusts the position of the 2D barcode such that an orientation marking is outside the text or other barcode. As shown in FIG. 8, the overlaid barcode 120 (a data matrix barcode in this example) includes orientation blocks 805 and timing codes 810 and 815 which help a barcode reader to detect the orientation of the barcode and the size and positions of the rows and columns in the barcode. In method 1400, the label creator adjusts the position of the 2D barcode, if possible, to avoid overlaying the text, graphics, or other barcodes. Although not necessary, doing so may reduce the number of errors when performing the method 400 in FIG. 4 since the barcode reader may more accurately determine the correct orientation of the 2D barcode as well as the location and size of the columns and rows when deriving the grid 905 illustrated in FIG. 9.

At block 1415, the label creator determines whether a block in the 2D barcode is filled with the darker shade according to a threshold. For example, the label creator may have a predefined threshold for determining when one of the empty blocks in the 2D barcode contains too much text, graphics, or portions of other barcodes so that the barcode reader may misinterpret the empty block as a filled block when performing the method 400. For example, if more than 90% of the pixels in an empty block contains pixels displaying text, graphics, or other barcodes, the label creator may determine that this block is essentially filled with the darker shade. The label creator may not need to evaluate the filled blocks in the 2D barcode since they can be completely or partially filled with the darker shade without causing an error in the method 400. In one embodiment, the label creator evaluates each empty block in the 2D barcode to ensure they are below the threshold.

If any block is filled with the darker shade as determined using the threshold, the method 1400 proceeds to block 1420 where the label creator moves the 2D barcode to a different position relative to the text, graphics, or other barcodes it overlays and then repeats block 1415 to ensure none of the empty blocks are filled by the darker shade corresponding to the text, graphics, or other barcodes. Blocks 1415 and 1420 can be repeated until the label creator has found a relative position between the 2D barcode and the darker shaded objects in the label where each block is readable. However, in other embodiment, the label creator may ensure that a minimum percentage of the empty blocks are readable (e.g., at least 95% of the empty blocks are not filled by the darker shade). If an empty block is mistakenly interpreted as a filled block when performing the method 400, error correction can be used to identify and correct those errors. Thus, not all of the blocks in the 2D barcode must be readable when overlaying the darker shaded objects in the label.

Once the label creator identifies a suitable position for the 2D barcode, the method 1400 proceeds to block 1425 where the label creator prints the overlaid 2D barcode and underlying text or other barcode onto a physical medium. One example is a shipping label printed on paper as illustrated by FIG. 1. However, as mentioned above, the embodiments herein can be used if the overlaid 2D barcode is not printed, but rather displayed on an electronic display screen.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
    generating, using a software label creator, a digital image encoding first data using a first barcode and second data using a 2D barcode overlaid onto the first barcode, the generating comprising:
        generating, using the software label creator, the 2D barcode, wherein the 2D barcode comprises a plurality of filled blocks, and a plurality of empty blocks, encoding the second data;
        manipulating the digital image by overlaying, using the software label creator, the 2D barcode onto the first barcode and text within the digital image such that portions of the first barcode and text are viewable within the plurality of filled blocks and the plurality of empty blocks, wherein the first barcode and the text are assigned a first shade of a color that is darker than a second shade of the color assigned to the plurality of filled blocks in the 2D barcode; and
        selecting the second shade of the color, for the digital image, to be below a cut threshold used by a barcode reader to read the first barcode such that the plurality of filled blocks is ignored by the barcode reader; and
    printing the 2D barcode, the first barcode, and the text onto a shipping label using the digital image.

2. The method of claim 1, wherein a background of the shipping label is assigned a third shade of the color that is lighter than the second shade of the color assigned to the plurality of filled blocks in the 2D barcode.

3. The method of claim 1, wherein the text is human readable, and wherein the text and the first barcode each extends across at least two of the plurality of filled blocks and at least two of the plurality of empty blocks.

4. A method comprising:
    generating, using a software label creator, a digital image encoding first data using a first barcode and second data using a 2D barcode overlaid onto the first barcode, the generating comprising:
        generating, using the software label creator, the 2D barcode, wherein the 2D barcode comprises a plurality of filled blocks, and a plurality of empty blocks, encoding the second data; and
        manipulating the digital image by overlaying, using the software label creator, the 2D barcode onto the first barcode and text within the digital image such that portions of the first barcode and text are viewable within the plurality of filled blocks and the plurality of empty blocks, wherein the first barcode and the text are assigned a first shade of a color that is darker than a second shade of the color assigned to the plurality of filled blocks in the 2D barcode, wherein the first shade is black, the second shade is grey, and a third shade is white; and
    printing the 2D barcode, the first barcode, and the text onto a shipping label using the digital image.

5. A method, comprising:
    generating, using a software label creator, a digital image encoding first data using a first barcode and second data using a 2D barcode overlaid onto the first barcode, the generating comprising:
        generating, using the software label creator, the 2D barcode, wherein the 2D barcode comprises a plurality of filled portions and a plurality of empty portions encoding the second data; and
        manipulating the digital image by overlaying, using the software label creator, the 2D barcode onto at least one of the first barcode or text within the digital image such that portions of the at least one first barcode or text are within the plurality of filled portions and the plurality of empty portions, wherein the plurality of filled portions are assigned an intermediate intensity value that is between a first intensity value assigned to the at least one first barcode or text and a second intensity value assigned to the plurality of empty portions, wherein the first, second, and intermediate intensity values are different intensity values of a same color; and
    transmitting a digital file based on the digital image containing the 2D barcode and the at least one first barcode or text to be at least one of displayed or printed.

6. The method of claim 5, wherein the intermediate intensity value is shade of grey that is between the first and second intensity values.

7. The method of claim 5, further comprising:
    selecting the intermediate intensity value to be below a cut threshold used by a barcode reader to read the first barcode such that the plurality of filled portions is ignored by the barcode reader.

8. A method, comprising:
    generating, using a software label creator, a digital image encoding first data using a first barcode and second data using a 2D barcode overlaid onto the first barcode, the generating comprising:
        generating, using the software label creator, the 2D barcode, wherein the 2D barcode comprises a plurality of filled portions, and a plurality of empty portions, encoding the second data; and
        manipulating the digital image by overlaying, using the software label creator, the 2D barcode onto at least one of the first barcode or text within the digital image such that portions of the at least one first barcode or text are within the plurality of filled portions and the plurality of empty portions, wherein the plurality of filled portions are assigned an intermediate intensity value that is between a first intensity value assigned to the at least one first barcode or text and a second intensity value assigned to the plurality of empty portions; and
    transmitting a digital file based on the digital image containing the 2D barcode and the at least one first barcode or text to be at least one of displayed or printed, wherein the 2D barcode overlays the first barcode, wherein the first barcode is a different 2D barcode, wherein a length and a width of the 2D barcode when printed or displayed are larger than a length and a width of the first barcode.

9. The method of claim 8, further comprising:
overlaying the 2D barcode onto a second barcode such that portions of the first barcode and the second barcode are within the plurality of filled portions and the plurality of empty portions, wherein the length and width of the 2D barcode when printed or displayed are larger than a length and width of the second barcode.

10. The method of claim 9, wherein the second barcode is a 1D barcode.

\* \* \* \* \*